Aug. 29, 1961 A. H. SMITH 2,998,559
DIELECTRIC CONTENTS GAUGE CAPACITOR AND METHOD OF MANUFACTURE
Filed March 2, 1956
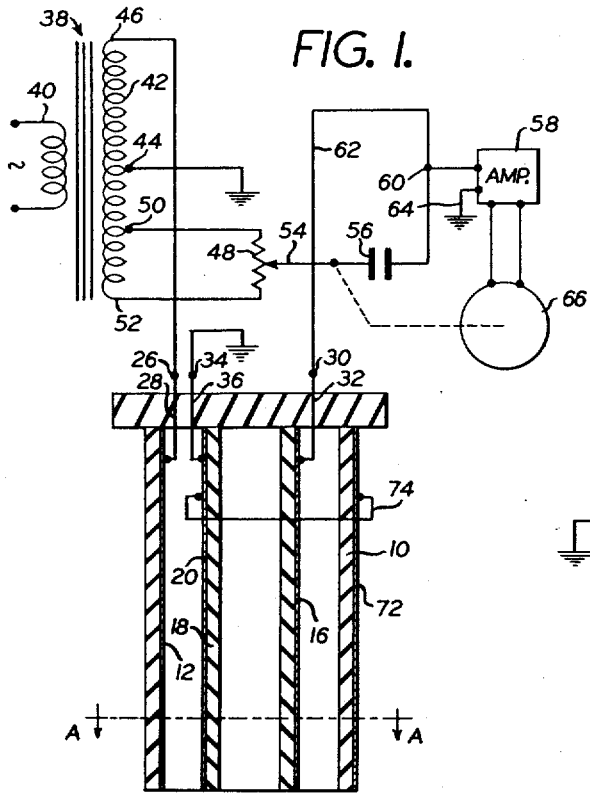
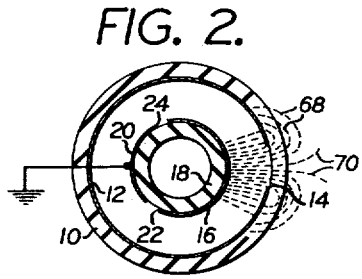
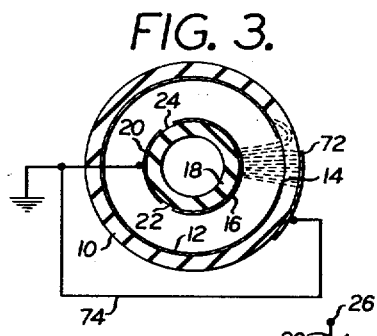
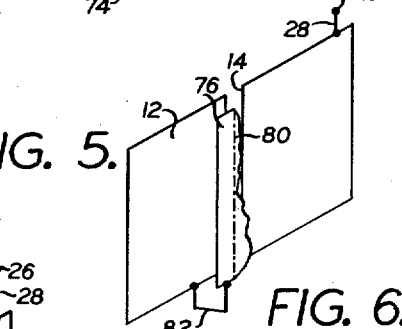
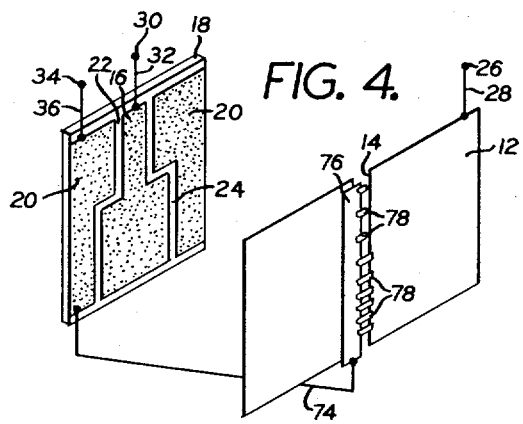
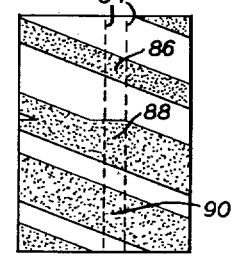
INVENTOR
ALBERT HENRY SMITH.
BY
Churchill, Rich, Weymouth & Engel
ATTORNEYS.

United States Patent Office 2,998,559
Patented Aug. 29, 1961

2,998,559
DIELECTRIC CONTENTS GAUGE CAPACITOR AND METHOD OF MANUFACTURE
Albert Henry Smith, Westbury, N.Y., assignor to Simmonds Precision Products, Inc., a corporation of New York
Filed Mar. 2, 1956, Ser. No. 569,188
11 Claims. (Cl. 317—246)

This invention relates to dielectric contents gauge capacitors, and more particularly to capacitors of the type employed in gauging circuits for measuring the volume or quantity of a dielectric fluid in a container.

A typical gauge capacitor consists of a pair of concentric cylindrical electrodes. More often than not the inner electrode is less than a complete cylinder and is provided with varying width throughout its length in order to adapt it for providing a linear output when used in conjunction with a container of irregular shape. Such an electrode has sometimes been referred to as a "profiled" electrode. When a profiled electrode is employed, it has heretofore been found desirable to include a further electrode which borders the marginal edges of the profiled electrode with a slight gap therebetween. When employed in a typical circuit, the further electrode is usually connected to ground potential and functions to suppress fringing of the electrostatic field at the aforesaid marginal edges. For convenience hereinafter the profiled electrode will be referred to as the inner active electrode while the aforementioned further electrode will be referred to as the guard electrode.

In constructing capacitors of the above type, it must be recognized that successive units will differ slightly in their capacitance characteristics due to tolerance limitations. In order to produce gauging capacitors which may be used interchangeably in a particular circuit, it is highly desirable that the capacity of the capacitor with no fluid between the electrodes be accurately established at a predetermined value. As a practical matter, it is necessary, therefore, to make some provision for adjustment of this initial capacity during manufacture.

The present invention is directed to a novel capacitor having an accurately present initial capacity and to the method for constructing same. The invention is particularly applicable to a capacitor having two concentric tubes of insulating material with the inner active electrode in the form of a metallic layer or coating on the outer surface of the inner tube and the second or outer active electrode in the form of a similar layer on the inner surface of the outer tube. In accordance with the present invention the second active electrode is provided with a gap therein which serves to give rise to a certain amount of fringing of the electrostatic field between the two active electrodes. By placing an auxiliary electrode in the form of a small strip or the like on the outer surface of the outer tube in the vicinity of the gap where it is readily accessible during manufacture, it is possible to modify the fringing effect and thus reduce or increase the capacity. The capacity is increased by augmenting the effective surface area of the second active electrode. The capacity is decreased by suppressing the amount of fringing. By the use of a conductive varnish or metallic spray or the like, an operator can readily modify the configuration of the auxiliary electrode in order to perform the requisite adjustment.

The invention will be better understood after reading the following detailed description with reference to the accompanying drawings in which:

FIG. 1 is a quasi-diagrammatic, quasi-schematic illustration of the basic elements of a capacitor constructed in accordance with the present invention and a circuit with which it may operate;

FIG. 2 is a diagrammatic sectional view taken on line A—A of FIG. 1 and showing the fringing of the electrostatic field which takes place through the gap in the outer active electrode in the absence of the auxiliary electrode on the outer surface of the outer tube;

FIG. 3 is a diagrammatic view similar to FIG. 2 showing the effect of the auxiliary electrode which in conjunction with the gap in the outer active electrode forms the basis of the present invention;

FIG. 4 is a developed diagrammatic showing of the concentric tubes of the capacitor of FIG. 1;

FIG. 5 shows in a similar manner a modification of the outer tube electrodes of FIG. 4; and FIG. 6 diagrammatically illustrates the application of the invention to a capacitor wherein the profiled electrode is in the form of a helix or spiral.

Referring now to FIGS. 1, 2 and 3 of the drawings, the capacitor is shown as comprising a first or outer cylinder 10 formed of an insulating material. The inner surface of the cylinder 10 has secured thereto a first layer of conductive material 12 which extends substantially throughout the entire height of the capacitor and, in the illustrated embodiment, is provided with a longitudinal gap 14 extending throughout its length. The layer 12 constitutes the outer active electrode of the capacitor. The inner active electrode is in the form of a metallic layer 16 secured to the outer surface of a second cylindrical tube 18 of insulating material. The tube 18 has a smaller diameter than the tube 10 and is disposed concentrically within the latter. A further or guard electrode 20 in the form of another layer of conductive material is secured to the outer surface of the tube 18 spaced from the electrode 16 by the gaps 22 and 24. It will be observed from FIG. 2 that the gap 14 in the electrode 12 is located opposite the inner active electrode 16. In FIG. 1 it will be seen that electrode 12 is electrically connected to a terminal 26 by a connection 28. In a similar manner electrode 16 is connected to the terminal 30 by a connection 32 and electrode 20 is connected to the terminal 34 by the connection 36. Except for the gap 14 the construction so far described is conventional.

A typical circuit for use with the capacitor is shown in the upper half of FIG. 1. A transformer 38 has a primary winding 40 provided with terminals for connection to a source of alternating current. It also has a secondary winding 42 having a mid-tap 44 connected to ground and a first end 46 connected to the terminal 26 of the capacitor. A rebalancing potentiometer 48 is connected between taps 50 and 52 at the opposite end of the winding 42. A slicer 54 forming a part of the potentiometer 48 is connected to a reference capacitor 56 which in turn is connected to the input of an amplifier 58 via a junction 60. A further connection 62 is established between the junction 60 and the gauge capacitor terminal 30. The input circuit for the amplifier 58 is completed by the ground connection 64. The amplifier output is connected for supplying power to a motor 66 whose drive shaft is coupled for positioning the potentiometer slider 54. The circuit is completed by a connection from capacitor terminal 34 to ground. In operation, the motor 66 will position the slider 54 downwardly until the current flowing through the capacitor 56 is equal and opposite to the current flowing between the terminals 26 and 30 of the measuring or gauging capacitor. A change in the quantity of fluid between the electrodes 12 and 16 will cause a repositioning of the slider 54 to restore circuit balance.

The construction of the capacitor might be understood a little better by digressing momentarily to consider FIG. 4. This figure has been produced by making an imaginary cut in the two tubes 10 and 18 of FIG. 1 along a common radius and developing the tubes so that they lay flat in parallel planes. Wherever appropriate the same reference numerals used in FIGS. 1, 2 and 3 are also used in FIG. 4. The inner active electrode 16 has been given an arbitrary profile solely for the purpose of illustration. As a drafting convenience, the insulating cylinder 10 has been omitted. This permits the electrodes which are supported on tube 10 to be more clearly shown.

The gap 14 provided in the outer active electrode 12 as seen in FIG. 2 gives rise to an appreciable amount of fringing of the electrostatic field between electrodes 12 and 16. This is illustrated schematically by the field lines 68. It will be observed that the field actually passes through the gap in electrode 12 and through the insulating material forming the cylinder 10 whereupon it follows a reentrant path impinging upon the outer surface of electrode 12. It will be understood, of course, that some of the field will reach electrode 12 without actually passing beyond the outer surface of the cylinder 10; however, the greater part of the fringing field follows a path approximately as shown in the drawing. The net effect is that the capacity of the capacitor is reduced by a small quantity due to the field lines 70 which do not reach electrode 12. However, this reduction is capacity is nowhere near what might be expected from a consideration of the reduction in actual area of the electrode 12.

In proportioning the electrodes of the capacitor for manufacture they should be so selected that when the capacitor reaches the stage in construction shown in FIG. 2, its total capacity without fluid between the electrodes will be somewhat higher than that which is ultimately desired. It is to be understood that the departure of the actual capacity from the value ultimately desired will vary within small limits due to the aforementioned tolerance limitations of manufacture. Assuming that it is necessary to decrease the capacity in order to arrive at the desired value, the arrangement shown in FIGS. 3 and 4 may be employed. As shown, an auxiliary electrode 72 is secured to the outer surface of the outer cylinder 10 and connected electrically by an internal connection 74 to the guard electrode 20. Thus when the capacitor is used in a circuit similar to that shown in FIG. 1, the auxiliary electrode 72 is maintained at ground potential. Its effect upon the electrostatic field existing in the vicinity of the gap 14 is illustrated in FIG. 3. It will be observed that a good portion of the field which had previously found its way to the outer active electrode 12 is now diverted to the auxiliary electrode 72. This serves to reduce the capacity existing between the electrodes 12 and 16 and, therefore, between the terminals 26 and 30 of FIG. 1.

As shown in FIG. 4 a preferred method is to secure a narrow strip 76 to the outside of the cylinder 10 (not shown) closely adjacent and parallel to the gap 14. This strip may be applied to the surface of the cylinder 10 by the use of a conductive varnish or by the use of a metallic spray applied through a suitable mask. The particular method used for producing a metallic or conductive layer per se does not form a part of the present invention. When the strip 76 is provided on the outer surface of the cylinder 10, it is arranged to have no effect upon the fringing in the vicinity of the gap 14. Now, the capacitor may be connected to a calibrating circuit of which the basic elements are shown in FIG. 1. The operator then determines the amount of adjustment required to bring the initial capacity of the capacitor to the desired value. He then reduces the capacity by degrees by the addition of the horizontally or laterally disposed electrode extensions 78. A convenient way of adding these extensions to the electrodes 76 is by the use of a conductive varnish which may be merely brushed on. Each of the extensions 78 will influence the electrostatic field as described with reference to FIG. 3. The net results is to change the configuration and location of the auxiliary electrode relative to the gap 14.

It will be observed in FIG. 4 that the extensions 78 are more numerous and more closely spaced over one portion of the gap than over another. The density of the adjusting extensions 78 will be seen to correspond to the width of the active electrode 16. The reason for the above is as follows. If the extensions were evenly distributed, then the capacity of the capacitor would be decreased uniformly throughout its length. This would have the effect of changing the proportional relationship which exists between the various widths of the inner active electrode 16. This change in proportionality is undesirable from a standpoint of measuring accuracy and interchangeability. Therefore, if more of the adjustment is concentrated in those areas served by a wider portion of the profiled electrode, it will tend to maintain the proportional relationship. Of course, in the end, this will only be an approximation and may be ignored if the errors so introduced are considered of lesser importance.

Instead of adding additional material to provide the extensions 78, it is also possible to initially form the auxiliary electrode 76 such that it completely covers the gap 14, whereupon the adjustment will be effected by removal of the material at appropriate points. Either a conductive varnish or a metallic sprayed layer can be removed manually.

The use of horizontal extensions as shown in FIG. 4 are dictated by convenience. It is not necessary, however, in the practice of the invention to limit oneself to this type of configuration. Instead a continuous adjustment may be introduced as illustrated in FIG. 5. The portion comprising the adjustment appears to the right of the dot-dash line 80. FIG. 5 further illustrates a modification of the invention wherein the function of the auxilary electrode is to augment the capacity rather than decrease same. Circuitwise it differs from the capacitor previously described in that the auxiliary electrode 76 is now connected internally to the outer active electrode 12 rather than to the guard electrode. See the connection 82. In operation the auxiliary electrode 76 now functions to capture the electrostatic field, shown by the lines 70 in FIG. 2, which had theretofore been lost. It is still necessary, however, in order to maintain the proportionality between the various portions of the electrode 16 to concentrate most of the adjustment in those areas where the profile width is the greatest.

It has been assumed throughout the discussion above that the profiled electrode is disposed in a longitudinal direction on the tube 18. However, it sometimes is desirable to dispose this electrode in the form of a spiral as shown in FIG. 6. The gap in the outer active electrode may then cooperate with the spiral profiled electrode as shown by the dashed lines 84. It will be observed here, however, that adjustment is confined to the regions of overlap indicated at 86, 88 and 90. This will of course introduce some distortion into the profile characteristic of the inner active electrode. It is possible to mitigate some of this distortion, however, by suitably enlarging the profiled area adjacent the aforesaid overlap regions in the same zone therewith.

No attempt has been made to specify the exact size of the gap in the outer active electrode. Theoretically it may have any size, but in practice it is desirable to make it as small as possible consistent with the requisite range of adjustment. The effect of a larger gap is to require an increase in the over-all physical size of the capacitor for any given initial capacity. A preferred practice is to select the gap sufficiently small such that the fringing effect, in the absence of the auxiliary electrode, substantially neutralizes the effect of the gap upon the capacity of the capacitor.

It is contemplated that numerous modifications and variations may be made without departing from the scope of the invention. For example, more than one gap may be provided in the outer electrode and such gaps may be located at intermediate points in said electrode without extending throughout its length. The electrodes may be self supporting rather than dependent upon an insulating support. The location of the gap relative to the profiled electrode may be varied so long as it is opposite at least a portion thereof. The additional conductive material added during adjustment of the various embodiments requiring same may be sprayed on with the aid of suitable masks.

For the sake of completeness of disclosure, a suitable spray for producing a metallic silver layer may consist of a silver nitrate solution plus a reducing solution. These are applied simultaneously with a double barreled spray gun. A conductive varnish may consist of equal parts by weight of varnish and silver flake powder. In the case of the varnish some curing in an oven may be required.

The internal connections 74 and 82 in the capacitor serve to reduce the number of binding posts required on the finished unit. The manner in which the connections may actually be constructed will be readily apparent to those skilled in the art to which the present invention appertains.

Further modifications will occur to those reading the above description. It is, therefore, intended that the invention be limited only to the extent required by the appended claims.

What I claim is:

1. A dielectric contents gauge capacitor comprising a pair of spaced apart electrodes, means supporting said electrodes for immersion in a non-gaseous dielectric fluid in a container so as to receive the fluid in the space therebetween with the capacity between said electrodes varying in a desired manner as the immersed length changes, one of said electrodes being formed of a first layer of conductive material secured to one side of an insulating support so as to face the other of said electrodes and provided with a gap therein, a second layer of a conductive material secured to the opposite side of said insulating support closely adjacent to said gap for modifying the fringing effect between said pair of electrodes of the electrostatic field which would normally occur in the vicinity of said gap, the arrangement being such that said second layer modifies said fringing effect as a function of the location and configuration of its effective area relative to said gap and means including separate connections for each of said pair of electrodes for connecting said pair of electrodes and said second layer to an electrical measuring circuit, to provide thereby a contents gauge capacitor whose initial capacity without fluid between its electrodes can be accurately pre-determined.

2. A dielectric contents gauge capacitor according to claim 1, wherein said second layer of conductive material comprises a manually removable coating.

3. A dielectric contents gauge capacitor according to claim 1, wherein said second layer of conductive material consists of a conductive varnish.

4. A dielectric contents gauge capacitor according to claim 1, wherein said second layer of conductive material consists of metallic silver.

5. A dielectric contents gauge capacitor according to claim 1, wherein said insulating support is in the form of a cylinder surrounding said other electrode, and said first and second layers are secured respectively to the inner and outer surfaces of said cylinder, whereby said second layer is comparatively accessible.

6. A dielectric contents gauge capacitor according to claim 5, wherein said other electrode consists of a third layer of conductive material secured to the outer surface of another cylinder of insulating material and shaped to occupy less than the entire outer surface thereof, said third layer being positioned relative to said first layer so as to have a portion overlying the gap therein.

7. A dielectric contents gauge capacitor according to claim 1, wherein the last mentioned means comprise an electrical connection within the capacitor between said first and second layers, means for connecting the other of said electrodes to said measuring circuit, and common means for connecting both of said layers to said measuring circuit, to provide thereby a contents gauge capacitor whose initial capacity without fluid between electrodes is adjustable in the direction of increasing capacity by controlling the location and configuration of said second layer.

8. A dielectric contents gauge capacitor comprising a pair of spaced apart electrodes, means supporting said electrodes for mounting in a container for immersion in the dielectric contents therein to substantially the entire depth of the contents and to receive the dielectric contents in the space therebetween, said electrodes each extending substantially throughout the height of the capacitor, one of said electrodes being formed of a first layer of conductive material secured to one side of an insulating support so as to face the other of said electrodes and provided with a gap in said layer extending generally longitudinally thereof and coextensive therewith, a second layer of a conductive material secured to the opposite side of said insulating support in the form of a strip substantially parallel and closely adjacent to said gap and substantially coextensive therewith for suppressing as a function of the location and configuration of its effective area relative to said gap more or less of the fringing of the electrostatic field between said pair of electrodes which would normally occur in the vicinity of said gap, said location and configuration having been predetermined during manufacture, and means including separate connections for each of said pair of electrodes for connecting said pair of electrodes and said second layer to an electrical measuring circuit, to provide thereby a contents gauge capacitor whose initial capacity without fluid between its electrodes has been accurately pre-determined.

9. A dielectric contents gauge capacitor comprising a pair of spaced apart electrodes, means supporting said electrodes for mounting in a container for immersion in the dielectric contents therein to substantially the entire depth of the contents and to receive the dielectric contents in the space therebetween, said electrodes each extending substantially throughout the height of the capacitor, one of said electrodes being formed of a first layer of conductive material secured to one side of an insulating support so as to face the other of said electrodes and provided with a gap in said layer extending generally longitudinally thereof and coextensive therewith, the size of said gap being sufficiently small such that fringing of the electrostatic field between the pair of electrodes can substantially neutralize the effect of the gap upon the capacity of the capacitor, a second layer of a conductive material secured to the opposite side of said insulating support in the form of a strip substantially parallel and closely adjacent to said gap and substantially coextensive therewith for suppressing as a function of the location and configuration of its effective area relative to said gap more or less of the fringing of the electrostatic field between said pair of electrodes which would normally occur in the vicinity of said gap, said location and configuration having been established during manufacture, and means including separate connections for each of said pair of electrodes for connecting said pair of electrodes and said second layer to an electrical measuring circuit, to provide thereby a contents gauge capacitor whose initial capacity without fluid between its electrodes has been accurately pre-determined without increasing the physical size of the capacitor for any given capacitance.

10. A dielectric contents gauge capacitor comprising a pair of spaced apart electrodes, means supporting said electrodes for immersion in a non-gaseous dielectric fluid in a container so as to receive the fluid in the space therebetween with the capacity between said electrodes varying in a desired manner as the immersed length changes, one of said electrodes being formed of a first layer of conductive material secured to one side of an insulating support so as to face the other of said electrodes and provided with a gap therein, a second layer of a conductive material secured to the opposite side of said insulating support closely adjacent to said gap for modifying the fringing effect between said pair of electrodes of the electrostatic field which would normally occur in the vicinity of said gap, the arrangement being such that said second layer modifies said fringing effect as a function of the location and configuration of its effective area relative to said gap, a further electrode bordering with a small gap therebetween those marginal edges of said other electrode at which it is desired to suppress the fringing of the electrostatic field which would normally occur, an electrical connection within the capacitor between said further electrode and said second layer, separate means for connecting each of said pair of electrodes to an electrical measuring circuit, and common means for connecting both said further electrode and said second layer to said circuit, to provide thereby a contents gauge capacitor whose initial capacity without fluid between its electrodes can be adjusted during manufacture by controlling the location and configuration of said second layer.

11. A dielectric contents gauge capacitor comprising a first cylindrical support of insulating material of a length to extend between desired levels in a given fluid container, a first layer of conductive material affixed to the outer surface of said first support and occupying less than the entire surface thereof so as to form the first capacitor electrode, means for making an external electrical connection to said first electrode, a second layer of conductive material affixed to substantially all of the remaining outer surface of said first support except for a small continuous gap where it borders the marginal edges of said first layer, a second cylindrical support of insulating material surrounding said first support in spaced concentric coextensive relationship thereto, a third layer of conductive material affixed to the inner surface of said second support so as to form the second capacitor electrode, said third layer having a gap therein extending generally longitudinally thereof and coextensive therewith at a point where it opposes a substantially maximum portion of said first electrode, means for making an external electrical connection to said second electrode, a coating of a conductive material affixed to the outer surface of said second support in the form of a strip parallel and closely adjacent to said gap and extending substantially throughout the length of said second support, means for establishing a conductive connection between said second layer and said strip, common means for making an external electrical connection to both said interconnected strip and said second layer, the strip being located and configured relative to said gap such that it can when suitably energized reduce in a desired manner the fringing of the electrostatic field which would normally exist between said first and second electrodes at said gap, and means mounting said supports in said relationship for immersion in a non-gaseous dielectric fluid in a container so as to receive the fluid in the space therebetween with the capacity between said capacitor electrodes varying in a desired manner as the immersed length changes, to provide thereby a contents gauge capacitor whose initial capacity without fluid between its electrodes can be adjusted during manufacture by control of the location and configuration of said strip with respect to said gap.

References Cited in the file of this patent

UNITED STATES PATENTS

| | | |
|---|---|---|
| 2,540,658 | DeGiers | Feb. 6, 1951 |
| 2,582,399 | Smith | Jan. 15, 1952 |
| 2,713,144 | Montllor | July 12, 1955 |
| 2,715,681 | Campbell | Aug. 16, 1955 |
| 2,741,124 | Meyers | Apr. 10, 1956 |

FOREIGN PATENTS

| | | |
|---|---|---|
| 938,646 | France | Apr. 12, 1948 |
| 938,682 | France | Apr. 12, 1948 |